United States Patent
Fidotti

(10) Patent No.: US 7,171,783 B1
(45) Date of Patent: Feb. 6, 2007

(54) CONTAINER FOR THE CULTIVATION OF PLANTS

(76) Inventor: Giampiero Fidotti, Via F. Ripandelli 8, Rome (IT) I-0049

( * ) Notice: Subject to any disclaimer, the term of this patent is extended or adjusted under 35 U.S.C. 154(b) by 396 days.

(21) Appl. No.: 10/221,740

(22) PCT Filed: Mar. 12, 2001

(86) PCT No.: PCT/IT01/00123

§ 371 (c)(1),
(2), (4) Date: Jan. 6, 2003

(87) PCT Pub. No.: WO01/67845

PCT Pub. Date: Sep. 20, 2001

(30) Foreign Application Priority Data

Mar. 14, 2000   (IT) ............ RM2000A0130

(51) Int. Cl.
*A01G 9/02* (2006.01)
(52) U.S. Cl. ............................................ 47/81
(58) Field of Classification Search ............ 47/79, 47/80
See application file for complete search history.

(56) References Cited

U.S. PATENT DOCUMENTS

| | | | | |
|---|---|---|---|---|
| 1,216,642 A | * | 2/1917 | White | 47/80 |
| 1,450,633 A | * | 4/1923 | Hudson | 47/81 |
| 2,865,137 A | * | 12/1958 | Longacre | 47/80 |
| 3,552,058 A | * | 1/1971 | Fici | 47/79 |
| 3,753,315 A | * | 8/1973 | Adam | 47/79 |
| 3,783,555 A | * | 1/1974 | Peters | 47/79 |
| 3,903,644 A | * | 9/1975 | Swift et al. | 47/79 |
| D250,401 S | * | 11/1978 | O'Shea et al. | D11/152 |
| 4,160,342 A | * | 7/1979 | Dryer | 47/80 |
| 4,171,593 A | * | 10/1979 | Bigglestone | 47/79 |
| 4,198,784 A | * | 4/1980 | Sukert | 47/79 |
| 4,236,352 A | * | 12/1980 | Heaney et al. | 47/80 |
| 4,329,815 A | * | 5/1982 | Secrest | 47/80 |
| 4,335,540 A | * | 6/1982 | Allen | 47/79 |
| 4,344,251 A | * | 8/1982 | Edling | 47/80 |
| 4,557,070 A | * | 12/1985 | Oyama | 47/80 |
| 4,885,869 A | * | 12/1989 | Kim | 47/79 |
| 4,885,870 A | * | 12/1989 | Fong | 47/79 |
| 4,962,613 A | * | 10/1990 | Nalbandian | 47/79 |

(Continued)

FOREIGN PATENT DOCUMENTS

GB    2 095 083 A    9/1982

(Continued)

*Primary Examiner*—Jeffrey L. Gellner
(74) *Attorney, Agent, or Firm*—Sughrue Mion, PLLC

(57) ABSTRACT

A container (1) for the cultivation of plants is described, the container (1) comprising an inner container (2) for housing a plant cultivation medium (C), an outer container (3) fixed around the inner container (2) and provided with a bottom wall (5) arranged at a predetermined distance ($d_f$) from the bottom wall (5) of the inner container (2), the outer container (3) defining with the inner container (2) an airspace (7) substantially sealed in a fluid-tight manner, wherein a storage zone (A) of an irrigation liquid (L) is defined, and an elongated element (10) for the capillary upwelling of the irrigation liquid (L) towards said cultivation medium (C). The container (1) of the invention enables to provide the plant housed in the cultivation medium (C) with the proper quantity of irrigation liquid (L) as a function of the plant needs.

12 Claims, 2 Drawing Sheets

U.S. PATENT DOCUMENTS

| | | | |
|---|---|---|---|
| 4,991,346 A * | 2/1991 | Costa et al. | 47/80 |
| 4,993,186 A * | 2/1991 | Immonen | 47/79 |
| 4,996,792 A | 3/1991 | Holtkamp, Sr. | |
| 5,046,282 A * | 9/1991 | Whitaker | 47/79 |
| 5,058,319 A * | 10/1991 | Liao | 47/81 |
| 5,111,614 A | 5/1992 | Holtkamp, Sr. | |
| 5,329,729 A * | 7/1994 | Liang | 47/81 |
| 5,383,943 A * | 1/1995 | Ogawa et al. | 47/66.7 |
| 5,491,928 A * | 2/1996 | Potochnik | 47/79 |
| 5,918,416 A * | 7/1999 | Ammann, Jr. | 47/82 |
| 6,134,833 A * | 10/2000 | Bachman et al. | 47/80 |
| 6,138,408 A * | 10/2000 | Paternoster et al. | 47/48.5 |
| 6,178,688 B1 * | 1/2001 | Keating | 47/41.12 |
| 6,357,179 B1 * | 3/2002 | Buss | 47/65.5 |
| 6,363,658 B1 * | 4/2002 | Lai | 47/79 |
| 6,370,819 B1 * | 4/2002 | Reiss et al. | 47/81 |
| 6,505,440 B1 * | 1/2003 | Lai | 47/79 |
| 2002/0017058 A1 * | 2/2002 | Chung | 47/79 |

FOREIGN PATENT DOCUMENTS

WO      WO 90/06049      6/1990

* cited by examiner

CONTAINER FOR THE CULTIVATION OF PLANTS

FIELD OF THE INVENTION

The present invention relates to a container for the cultivation of plants and, more particularly, to a container for the cultivation of plants of the "sub-irrigation" type, i.e. a container adapted to provide the irrigation liquid to the plant from the bottom.

PRIOR ART

In the field of "sub-irrigation" containers for the cultivation of plants, a long-felt need is that of providing containers adapted to provide the plant with an efficient and long-lasting irrigation.

"Sub-irrigation" containers of the known type are essentially divided into different categories—each one with different variants—according to their operating principle.

A first sub-irrigation container of the known type, described in European patent application EP 0 515 207, involves the use of a reservoir for storing the irrigation liquid sealed in a non-tight manner and the exploitation of the microcapillarity of a porous material housed in an elongate hollow element having a first end immersed in the reservoir for storing the irrigation liquid and a second end which may be either substantially extending flush with the soil to be irrigated or which may be positioned within the same.

The soil is housed in a container under which the reservoir for storing the irrigation liquid is located, which reservoir is structurally independent from the container itself.

Moreover, in this first type of container, the reservoir for storing the liquid is in constant fluid communication with the atmosphere by means of an open pipe for filling the reservoir, which pipe passes through the soil and reaches the reservoir itself.

Another example of container including a reservoir for storing the irrigation liquid sealed in a non-tight manner is disclosed by International PCT application WO-A-9006049 which teaches to provide a container including a lower part or section for storing irrigation water, which section is said to be essentially closed outwards, so that the water contained therein is prevented from evaporating. Such a kind of closure of the storage zone is achieved by hanging a pot containing at least one plant within an opening centrally formed in the upper part or section of the container.

However, this first type of sub-irrigation container possesses some drawbacks which have not been overcome yet:

i) an unavoidable evaporation phenomenon of the irrigation liquid through the pipe for filling the reservoir with the ensuing need of frequently adding the irrigation liquid in the reservoir itself;

ii) a continuous supply of the irrigation liquid to the soil, which supply is absolutely unrelated to the actual needs of the plant, but only driven by the physical capillary upwelling mechanism of the liquid through the porous material; in this respect, the Applicant has found that such continuous supply of liquid, which spontaneously continues until liquid is present in the reservoir, can be greater than the actual needs of the plant, causing sooner or later the rotting of the roots and the subsequent death of the plant, itself;

iii) an uneven irrigation of the soil, which is humidified only in a localized way, i.e. in the vicinity of the end of the elongated hollow element, the end extending flush with or positioned in the soil; and iv) a considerable size of the container as a whole, the soil to be irrigated being equal, due to the presence of the reservoir for storing the irrigation liquid under the container for housing the soil.

A second sub-irrigation container of the known type, described for example in U.S. Pat. No. 3,775,904, involves the use of a reservoir for storing the irrigation liquid sealed in a tight manner, as well as the exploitation of the microcapillarity of a porous material interposed between a reservoir for storing the irrigation liquid and the cultivation soil.

Since the reservoir for storing the liquid, essentially constituted by an airspace between two concentric containers having substantially the same height, is fluid-tight, the evaporation phenomenon mentioned above in connection with the first sub-irrigation container, does not take place.

According to the specification of this patent, during the operation of the container the vacuum produced in the above-mentioned airspace as a consequence of the upwelling of the liquid in the soil through the porous material, would be capable to stop the liquid flow from the airspace to the soil until a certain amount of air is able to pass both through the soil and the above-mentioned porous material, thus restoring the atmospheric pressure above the surface of the liquid stored in the airspace.

According to the teachings of this patent, this could happen only when the soil is dry enough, triggering a cycle of alternate sub-irrigation and drying steps of the soil.

Nevertheless, the Applicant has found that the construction taught by U.S. Pat. No. 3,775,904 while theoretically enabling to trigger the above-mentioned cycle of alternate sub-irrigation and drying steps of the soil, is however unable to ensure that this object is actually achieved.

Since the storage zone of the irrigation liquid defined in the reservoir coaxially surrounds the inner container housing the soil or, in other words, is at the same level of the inner container housing the soil, during the initial step of filling the reservoir for storing the liquids there is an almost instantaneous transfer, according to the principle of communicating vessels, of a non-negligible amount of irrigation liquid in the soil, which becomes completely or partly soaked in the liquid before the airspace is tightly sealed. The subsequent drying of the soil may need so much time that in many instances the plant rots before the required alternation of sub-irrigation and drying steps of the soil can start.

SUMMARY OF THE INVENTION

Thus, the technical problem underlying the present invention is that of providing a container for the cultivation of plants which is capable to overcome the drawbacks of the cited prior art and, more particularly, to ensure an efficient sub-irrigation which reliably provides the plant with a supply of irrigation liquid actually proportional to the liquid needs of the plant itself.

According to the invention, this technical problem is solved by a container for the cultivation of plants as defined in attached claim 1.

In the following description and in the subsequent claims, the expression "plant cultivation medium" is used to indicate any suitable material for the germination, the growth and the vegetation of a plant, such as for example soil or material in gel form.

In the following description and in the subsequent claims, the expression "irrigation liquid" is used to indicate any suitable liquid ensuring the correct development and the correct vegetative activity of a plant, such as for example water, to which a fertilizer may optionally be added.

In the following description and in the subsequent claims, the term "fluid" is used to indicate any liquid or gaseous substance.

In the following description and in the subsequent claims, the expression "maximum level substantially equal to the predetermined distance between the bottom walls of the containers" is used to indicate a level of irrigation liquid which may not only be perfectly equal to said distance, but also slightly higher than such distance, provided that said level does not jeopardize the survival of the plant in the initial step of filling the storage zone by virtue of the transfer of the irrigation liquid according to the principle of communicating vessels.

According to the invention and thanks to the provision of a device which enables the user to control the maximum level of the irrigation liquid in the storage zone defined in the container, so that such maximum level is substantially equal to or lower than the bottom of the inner container, it is advantageously possible to prevent the irrigation liquid from spreading too much in the cultivation medium and thereby jeopardize the survival of the plant housed therein in the initial step of filling of the storage zone.

In other words, the combination of features of the container of the invention substantially reduces to zero the risk of an excessive irrigation of the plant cultivation medium before the desired alternation of sub-irrigation and drying steps of the soil can be triggered.

Advantageously, thanks to the presence of the means for putting the inner container and the airspace sealed in a tight manner in fluid communication with each other, the container of the invention promotes a continuous oxygenation of the cultivation medium and a natural irrigation, by means of said elongated element, of the plant cultivation medium so that an optimum, constant and balanced humidification always proportional to the liquid needs of the plant is provided.

Only if the cultivation medium is dry enough to let the air pass from the atmosphere into the airspace, in fact, a pressure is established in the airspace such that the irrigation liquid can upwell by capillarity through the elongated element. In other words, the upwelling of the irrigation liquid occurs only under conditions of dry cultivation medium, i.e. only when the plant needs liquid.

Moreover, the upwelling of the irrigation liquid stops when the pressure decrease in the airspace consequent to the upwelling of a certain amount of liquid is no longer compensated by a corresponding amount of air due to a spread irrigation of the cultivation medium and the consequent stop of the air transfer from the atmosphere into the airspace. In other words, the liquid upwelling stops when the cultivation medium is sufficiently irrigated, i.e. when the plant does not need liquid anymore.

In this manner, the desired beneficial alternation of upwelling steps of the irrigation liquid towards the cultivation medium and drying steps of the cultivation medium is actually ensured, preventing the liquid from stagnating in the cultivation medium in the initial step of filling of the storage zone.

The container of the invention also enables to ensure a long duration of the irrigation liquid, which is sucked by the cultivation medium only to the extent to which it is actually needed, thus obviating the need of continuous additions of liquid in the storage zone.

Advantageously, moreover, the inner container for housing the cultivation medium and the outer container defining around the inner container the airspace sealed in a fluid-tight manner may also be advantageously produced in one piece, enabling the manufacture of a simple, cost-effective and not cumbersome container.

Additionally, the container of the invention has a compact structure and accomplishes the maximum space reduction, with the same volume of the cultivation medium, in a way compatible with the correct operation of the container.

For the purposes of the invention, the container may be made of any material compatible with the survival and the vegetation of the plant and with the used irrigation liquids, such as for example plastics material, enameled terra-cotta, ceramics, metals or metal alloys, glass or crystal.

Preferably, the container of the invention is made of gas-proof plastics materials, such as polyethylene (PE), polypropylene (PP), polyesters, high impact polystyrene (PS), polyvinyl chloride (PVC).

In a preferred embodiment of the invention, the elongated element comprises an inner cavity separated from said cultivation medium by means of a fluid-permeable separation element.

Advantageously, the separation element prevents the cultivation medium from entering the cavity of the elongated element, and prevents the cultivation medium from being not only soaked in the irrigation liquid to the detriment of the vegetative and development functions of the plant roots, but also from being an obstacle both for the air transfer from the cultivation medium to the airspace, and for the opposite transfer of the upwelling irrigation liquid.

Preferably, the separation element comprises a grid made of a mesh of a suitable plastics material, a disk having a high porosity or any other structure or material adapted to allow an easy transfer in opposite directions of the air and of the irrigation liquid, and to efficiently retain the cultivation medium.

In a preferred embodiment, the cavity defined within the elongated element is at least partially filled with a fluid-permeable porous material.

In the following description and in the subsequent claims, the expression "porous material" is used to indicate any material comprising empty spaces able to ensure a transfer of essentially capillary type. Examples of porous materials include particulate materials, fibrous materials and materials comprising a plurality of capillary channels such as for example expanded clay, terra-cotta, ceramics, mortar, concrete, plaster, sawdust, sintered glass, porous plastics materials such as polyethylene or polyurethane in porous form, wood fibers, polyester fibers, non-woven fabrics incorporating a plurality of fibers oriented along the longitudinal direction of the elongated element and combinations thereof.

Advantageously, the porous material allows the upwelling of the irrigation liquid by capillarity and also constitutes a separation element between the storage zone of the irrigation liquid and the cultivation medium.

In an alternative embodiment, the elongated element may be made in a single full piece comprising one or more capillary channels for the upwelling of the irrigation liquid towards the cultivation medium.

According to a preferred embodiment of the container of the invention, said elongated element comprises an outer wall partially or completely made of a substantially non-compressible and liquid-impermeable material.

Advantageously, by properly selecting a suitable material for manufacturing the inner container, the outer container and the elongated element, such as for example polyethylene, the container may be manufactured as a single piece, thereby substantially reducing the production costs.

In this preferred embodiment, the means for putting the inner container and the airspace in fluid communication with each other further comprises at least one opening formed in a wall of the elongated element, so as to allow the above-mentioned transfer in opposite directions of the air and of the irrigation liquid from and to the inner cavity of the elongated element.

Preferably, such opening is formed in the lower end of the elongated element, which end is preferably substantially in contact with or anyway near to the bottom wall of the outer container, so as to use in a substantially complete manner the storing capability of the storage zone of the irrigation liquid.

Advantageously, said at least one opening carries out the additional function of allowing an easy percolation of the rain water in the cultivation medium, i.e. it avoids the creation of counterpressures in the cultivation medium which can hinder or prevent said percolation.

In a preferred embodiment, the means for putting the inner container and the airspace in fluid communication with each other comprises a plurality of round openings having a small diameter (generally not greater than about 2 mm), preferable arranged in two parallel and overlaid arrays.

According to a further preferred embodiment of the container of the invention, the elongated element is essentially integrally made of a fluid-permeable porous material, such as for example one of the materials mentioned above with reference to the previous embodiment.

Also in this case, the lower end of the elongated element is substantially in contact with the bottom wall of the outer container, in such a way to use substantially in a complete manner the storing capability of the storage zone of the irrigation liquid.

According to a preferred embodiment of the container of the invention, if the elongated element is essentially constituted by a fluid-permeable porous material, the means for putting the inner container and the airspace in gas communication with each other comprises the elongated element itself.

According to an alternative preferred embodiment of the container of the invention, the means for putting the inner container and the airspace in gas communication with each other further comprises a plurality of openings formed in the bottom wall of the inner container.

In this case, said openings advantageously carry out the additional function of allowing an easy percolation of the rain water in the cultivation medium according to what has been said above with reference to the opening(s) formed in the wall of the elongated element.

According to a preferred embodiment, the upper end of said elongated element is positioned within the inner container at a predetermined distance from the bottom wall of said inner container.

Advantageously, said preferred embodiment enables the elongated element to directly humidify also the portions of the cultivation medium which are further apart with respect to the bottom of the inner container, thus ensuring, when required, a spread and uniform irrigation of the central portions of the cultivation medium.

In both the above mentioned preferred embodiments of the container of the invention, i.e. whether the elongated element comprises an inner cavity separated from the cultivation medium by means of a fluid-permeable separation element or whether the elongated element is integrally made of a fluid-permeable porous material, the upper end of the elongated element may extend substantially flush with the bottom wall of the inner container.

BRIEF DESCRIPTION OF THE DRAWINGS

Additional features and advantages of the present invention will become more clearly apparent from the following detailed non limitative description of some preferred embodiments of the container for the cultivation of plants according to the invention, made hereinafter as an indication with reference to the attached drawings.

In such drawings.

DETAILED DESCRIPTION OF PREFERRED EMBODIMENTS

Figure 1:
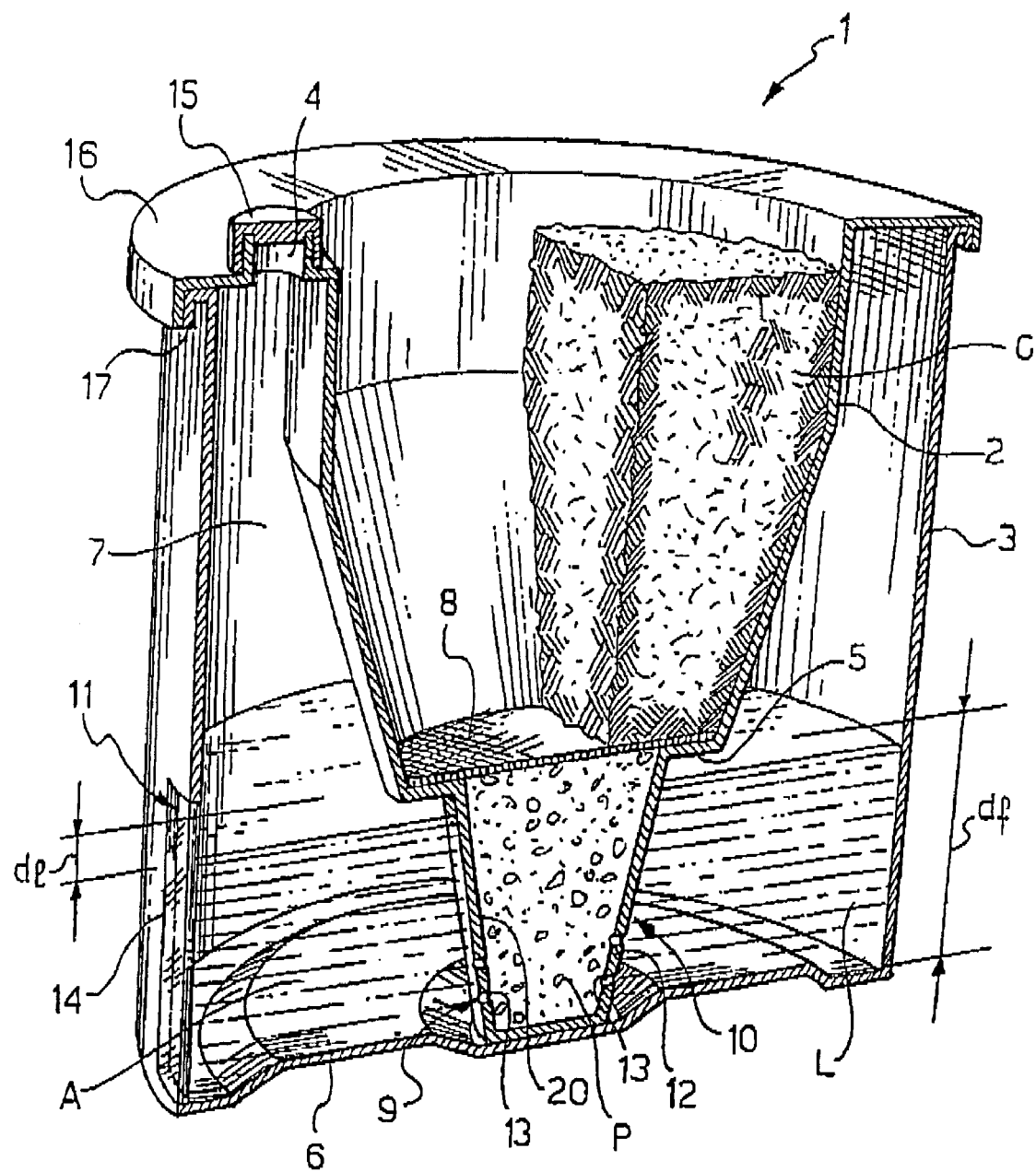
FIG. 1 shows a perspective cross-sectional view of a first embodiment of the container for the cultivation of plants according to the invention.

With reference to FIG. 1, reference numeral 1 generally indicates a container for the cultivation of plants according to a first embodiment of the invention.

According to the invention, the container 1 comprises an inner container 2 for housing a plant cultivation medium C (not shown), such as for example soil of type known per se, and an outer container 3 coaxially fixed around the inner container 2. The inner container 2 and the outer container 3 are preferably made of a material selected among the fluid-impermeable plastics materials, such us for example polyethylene.

The inner container 2 is provided with a bottom wall 5, whereas the outer container 3 is provided with a bottom wall 6 arranged at a predetermined distance $d_f$ from the bottom wall 5 of the inner container 2.

According to the illustrated embodiment, the inner container 2 is provided in its upper part with a rim 16 radially outwardly extending from the walls of the container 2 and adapted to engage in a fluid-tight manner with a respective upper rim 17 radially outwards extending from the container 3.

The outer container 3 defines with the inner container 2 an airspace 7 substantially sealed in a fluid-tight manner, wherein a storage zone A of a suitable irrigation liquid L, such as for example water, is defined.

In order to allow the filling of the storage zone A, the container 1 of the invention is provided in its upper part with a filling opening 4, suitably sealed by a closing device adapted to ensure the aforementioned fluid-tight sealing of the airspace 7, such as for example a screw plug 15 provided with a sealing gasket not shown and known per se.

The container 1 also comprises an elongated element 10 for the upwelling of the irrigation water L into the soil C, means 9 for putting the inner container 2 and the airspace 7 in gas communication with each other and a control device 11 of the maximum level of the irrigation water L, which level is substantially equal to and preferably lower than the predetermined distance $d_f$ between the bottom walls 5 and 6, as illustrated in FIG. 1. In such Figure, $d_1$ indicates the distance between the maximum filling level of the storage zone A and the bottom wall 5 of the inner container 2.

According to the invention, the elongated element 10 extends between the bottom wall 5 of the inner container 2 and the storage zone A of the irrigation liquid L. Preferably, as shown in FIG. 1, the elongated element extends between the bottom walls 5 and 6, i.e. the elongated element has a length substantially equal to the distance $d_f$. In this way, substantially all the irrigation liquid L stored in the storage zone A may advantageously be used to irrigate the plant cultivation soil C.

The elongated element 10 for the upwelling of the irrigation water from the storage zone A to the soil C, is in this example constituted by a substantially frusto-conical hollow body 12 integrally extending from the bottom wall 5 of the inner container 2.

Advantageously, the frusto-conical shape of the elongated element 10 enables a more homogeneous distribution of the irrigation liquid L in the soil C in a transversal direction, i.e. perpendicularly to the upwelling direction of the liquid itself.

The elongated element 10 is provided with an inner cavity 20 filled with a fluid-permeable porous material P, such as for example expanded clay.

Conveniently, the porous material P enables—during use—the upwelling of the irrigation water L by capillarity from the storage zone A defined in the airspace 7 towards the soil C.

Preferably, a fluid-permeable separation element 8, such as for example a polyamide grid with a mesh having sides of about 1 mm, is interposed between the soil C and the hollow body 12 in such a way to close the cavity and to maintain the hollow body 12 separated from the soil C.

In the illustrated preferred embodiment, the means 9 for putting the inner container 2 and the airspace 7 in fluid communication with each other comprises both the porous material P and a plurality of round openings 13 having a small diameter, for example of about 2 mm, formed at a lower end of the elongated element 10 and arranged along two parallel and overlaid arrays.

In the illustrated preferred embodiment, the control device 11 of the maximum level of the irrigation water L comprises a window 14 made of transparent plastics material formed in a wall of the outer container 3 and having a length capable to enable the control of the level of the irrigation water L during the filling of the storage zone A, in particular in such a way that the level of the irrigation water L is not higher than said maximum level. In the illustrated example, the window 14 also enables to control when the irrigation water stored in the zone A is drying up, so that it is possible to fill it again in time.

With reference to FIG. 1, the operation of the shown sub-irrigation container 1 illustrated therein will be described.

The storage zone A is filled by pouring the irrigation water L through the filling opening 4. In particular, the irrigation water L is poured until the maximum level is reached, which can be seen through the window 14, preferably in such a way to fill the airspace 7 at a level lower than the bottom wall 5 of the inner container 2.

In this way, the risk of reaching an excessive irrigation of the soil C evidenced by the containers manufactured according to U.S. Pat. No. 3,775,904, which may jeopardize the survival of the plant, is advantageously fully overcome.

Once the storage zone A has been filled to the maximum level, the filling opening 4 is tightly sealed by means of the suitable screw plug 15.

In a subsequent step, the irrigation water L spontaneously upwells by capillarity from the storage zone A to the plant cultivation soil C, passing through the porous material P and the grid 8.

Conveniently, this upwelling of the irrigation water L, which takes place only when the humidity content of the soil C has been reduced due to the natural water evaporation and/or to the water consumption by the plant, continues until a vacuum in the airspace 7 is created, which prevents the continuation of the upwelling itself. The vacuum is compensated only when a certain amount of air can pass, in succession, through the soil C, the separation element 8 and the porous material P housed in the cavity 20 and enter the airspace 7 through the opening 13, thus re-establishing the pressure in the airspace 7 and enabling the upwelling by capillarity to start again.

Since the air transfer in the airspace 7 takes place only when the soil is dry enough, a positive cycle of alternate sub-irrigation and drying steps of the soil is established, thus using the irrigation water L only when necessary.

In other words, the container of the invention advantageously enables to carry out a spontaneous and "automatic" transfer of the irrigation water L to the soil C according to the plant needs, substantially eliminating the risks of rotting during the initial step of filling the storage zone A with the irrigation liquid.

Figure 2:
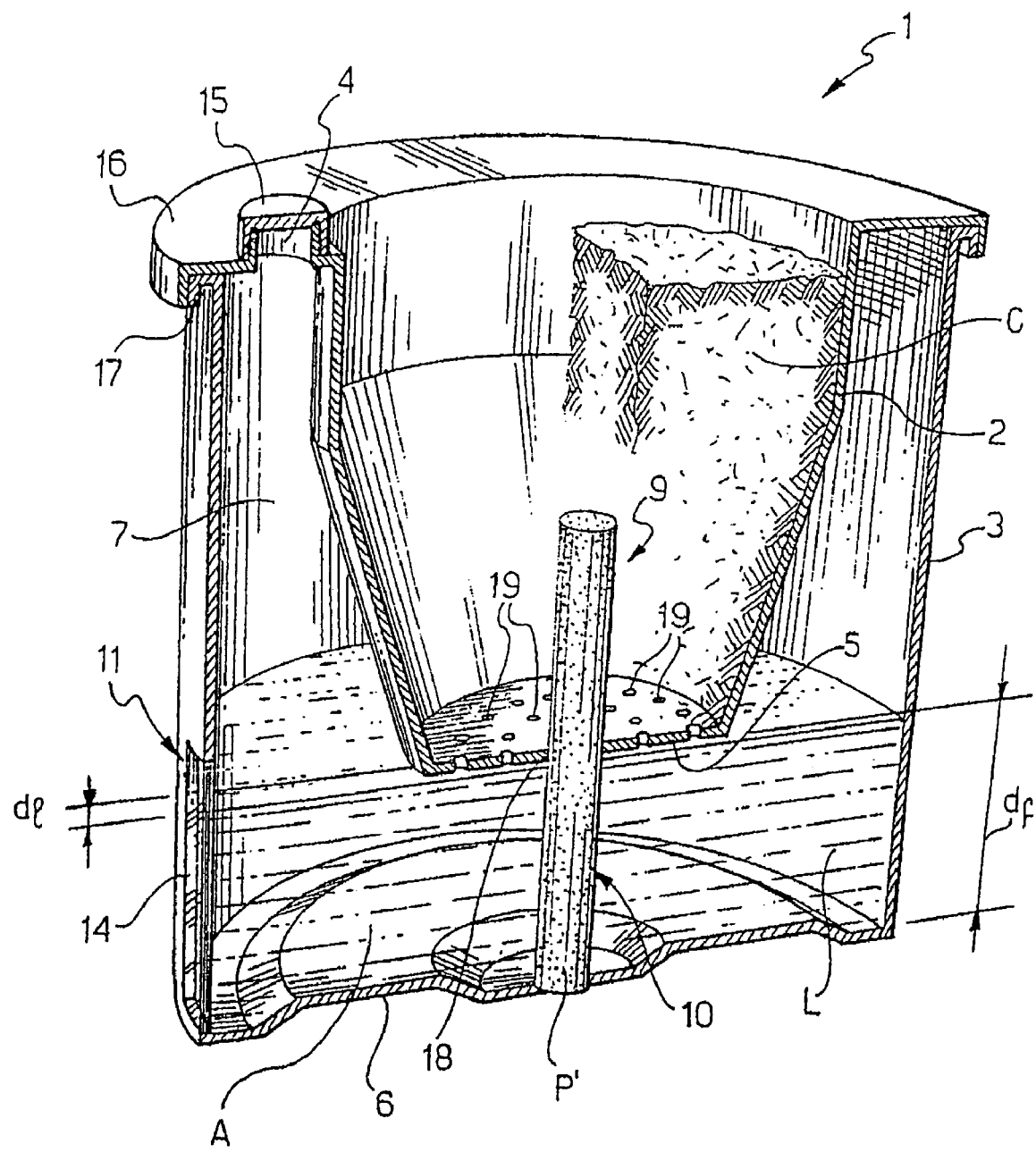
FIG. 2 shows a perspective cross-sectional view of a second embodiment of the container for the cultivation of plants according to the invention.

FIG. 2 illustrates a second embodiment of the container 1 according to the invention.

In the following description and in said Figure, the elements of the container 1 which are structurally or functionally equivalent to those previously illustrated with reference to FIG. 1 shall be indicated with the same reference numerals and they shall not be described any further.

In the embodiment of FIG. 2, the inner container 2 is provided with a bottom wall 5 provided in turn with a through bore 18 through which the elongated element 10, in this case substantially made of a porous material P', is mounted. According to this embodiment, the porous material P' has substantially a cylindrical shape and is preferably made of terra-cotta with capillary channels therein.

In this second embodiment of the invention, the means 9 for putting the inner container 2 and the airspace 7 in fluid communication with each other comprises both the elongated element 10 itself and a plurality of openings 19 formed in the bottom wall 5 of the inner container 2.

Preferably, the upper end of the elongated element 10 is positioned at a predetermined distance from the bottom wall 5 of the inner container 2, in such a way to be positioned in a central portion of the soil C.

From the above disclosure, it will be immediately evident that the irrigation by means of this embodiment of the container 1 is essentially accomplished in the same way described with reference to the previous embodiment, wherein the elongated element 10 comprises a hollow body 12.

In this case, the air transfer through the soil C when the latter is dry enough is advantageously enhanced by the openings 19, which allow both an optimum alternation of sub-irrigation and drying steps of the soil C, and a regular percolation of the rain water through the soil C when the container 1 is used in the open air.

According to further embodiments of the container of the invention, the control device 11 of the maximum level of the irrigation liquid L may comprise, for example, a filling opening formed in a wall of the outer container 3 and arranged at a lower level with respect to the bottom wall 5 of the inner container 2, or other suitable means for allowing the user to advantageously control both the maximum level reached by the irrigation liquid L in the storage zone A, in such a way that the maximum level is substantially equal to or lower than the distance $d_f$ between the bottom walls 5 and 6, and the minimum level of said liquid so as to indicate the need of additions.

Obviously, a man skilled in the art may introduce changes and variants to the invention described above in order to satisfy specific and contingent application requirements, changes and variants which anyway fall within the scope of protection as defined by the following claims.

What is claimed is:

1. Container (1) for the cultivation of plants comprising:
   an inner container (2) for housing a plant cultivation medium (C), said inner container (2) being provided with a bottom wall (5);
   an outer container (3) fixed around said inner container (2) and provided with a bottom wall (6) arranged at a predetermined distance ($d_f$) with respect to the bottom wall (5) of said inner container (2), said outer container (3) defining with said inner container (2) an airspace (7) substantially sealed in a fluid-tight manner, wherein a storage zone (A) of an irrigation liquid (L) is defined;
   means (9) for putting said inner container (2) and said airspace (7) in fluid communication with each other;
   an elongated element (10) provided with means (P, P') for the upwelling by capillarity of the irrigation liquid (L) towards said cultivation medium (C), said elongated element (10) being extended between the bottom wall (5) of the inner container (2) and said storage zone (A) of the irrigation liquid (L);
   a control device (11) for controlling the maximum level of the irrigation liquid (L) in the storage zone (A), said maximum level being substantially equal to or lower than said predetermined distance ($d_f$) between said bottom walls (5, 6).

2. Container (1) according to claim 1, wherein said elongated element (10) comprises an inner cavity (20) separated from said cultivation medium (C) by means of a fluid-permeable separation element (8).

3. Container (1) according to claim 2, wherein said cavity (20) is at least partially filled with a fluid-permeable porous material (P).

4. Container (1) according to claim 2, wherein said elongated element (10) comprises an outer wall partially made of a substantially non-compressible and liquid-proof material.

5. Container (1) according to claim 2, wherein said means (9) for putting said inner container (2) and said airspace (7) in fluid communication with each other comprises at least one opening (13) formed in a wall of said elongated element (10).

6. Container (1) according to claim 2, wherein said elongated element comprises an outer wall completely made of a substantially non-compressible and liquid-proof material.

7. Container (1) according to claim 1, wherein said elongated element (10) is essentially made of a fluid-permeable porous material (P').

8. Container (1) according to claim 7, wherein the upper end of said elongated element (10) is positioned within the inner container (2) at a predetermined distance from the bottom wall (5) of said inner container (2).

9. Container (1) according to claim 1, wherein said means (9) for putting said inner container (2) and said airspace (7) in fluid communication with each other comprises said elongated element (10).

10. Container (1) according to claim 1, wherein said means (9) for putting said inner container (2) and said airspace (7) in fluid communication with each other further comprises a plurality of openings formed in the bottom wall (5) of said inner container (2).

11. Container (1) according to claim 1, wherein the upper end of said elongated element (10) extends substantially flush with the bottom wall (5) of said inner container (2).

12. Container (1) according to claim 1, wherein the lower end of said elongated element (10) is substantially in contact with the bottom wall (5) of said inner container (2).

* * * * *